June 3, 1941.        R. SAENGER        2,244,084
AUTOMATIC BRAKE ADJUSTMENT
Filed May 3, 1939
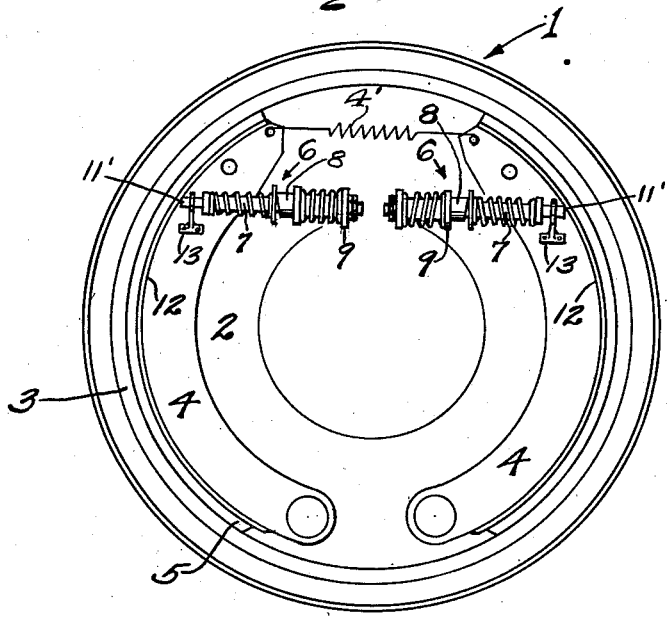
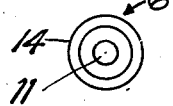
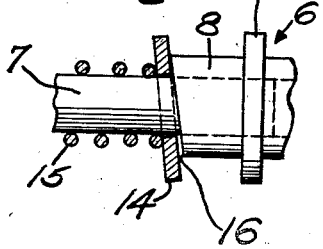
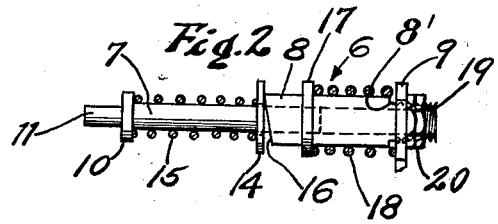
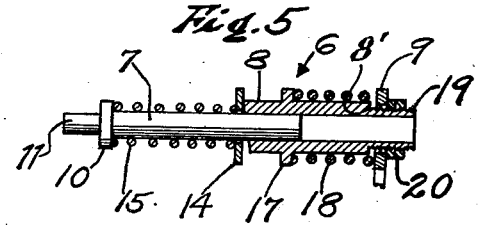
INVENTOR
RICHARD SAENGER
by John A. McDowell
his atty.

Patented June 3, 1941

2,244,084

UNITED STATES PATENT OFFICE 2,244,084

AUTOMATIC BRAKE ADJUSTMENT

Richard Saenger, Los Angeles, Calif.

Application May 3, 1939, Serial No. 271,450

3 Claims. (Cl. 188—79.5)

An object of this invention is to provide an easy and safe to use automatic brake adjustment for hydraulic brakes.

Another object of the invention is to provide a device that will maintain a working clearance between the brake drum and the brake shoe at all times.

A feature of the invention is the construction and arrangement of the device that permits automatic take up of any excess clearance due to wear of the linings and drums.

Other objects are simplicity of construction and cheapness of manufacture.

The invention may have a variety of applications and certain of the features of construction may be embodied in a variety of structures.

Other objects, advantages and features of the invention may appear from the accompanying drawing, the subjoined detailed description and the appended claims.

The accompanying drawing illustrates the invention.

Figure 1 is a fragmental diagrammatic front elevation of a hydraulic brake showing how the invention may be applied thereto.

Fig. 2 is an enlarged elevation partly in section showing the invention and assembly thereof. A fragment of the supporting bracket is also shown.

Fig. 3 is an end elevation of Fig. 2.

Fig. 4 is an enlarged fragmental elevational detail view partly in section showing how the locking washer is operated.

Fig. 5 is a view analogous to Fig. 2 only showing the cylinder unit in section and the other parts are shown in braking position.

A hydraulic brake is designated at 1 which is of the general construction and only such portion thereof illustrated as required to locate the automatic brake adjustment of my invention.

The backing plate 2 and drum 3, brake shoes 4 release spring 4' and brake lining 5 of the hydraulic brake are, or may be of any approved construction.

The brake adjustment indicated generally at 6 is so constructed and arranged to fit snugly in the hydraulic brake as shown in Fig. 1 and is provided with a plunger 7 that is slidably mounted to slide in a cylinder 8 that is attached to the backing plate 2 by a bracket 9.

The plunger 7 is provided with a shoulder 10 near one end and a reduced portion 11 beyond the shoulder that strikes against the brake shoe rim 12 as shown at 11' in Fig. 1 of the drawing.

A guide 13 in the shape of a bracket permits the reduced portion 11 to slide therein.

The other end of the plunger 7 is slidably mounted in the cylinder 8 and a locking washer 14 is slidably mounted on the plunger 7 and a compression spring 15 keeps the washer against the end 16. The cylinder 8 is cut at an angle so that as the washer 18 moves against the cylinder it will be caused to tilt at a slight angle relative to the plunger 7. The washer 14 has a substantial width and the opening in the washer which receives the plunger 7 fits rather closely about the plunger but is such a fit that when the washer 14 is tilted or canted slightly by contacting the inclined end of the cylinder 8 that it will tend to lock the plunger 7 as shown in Fig. 4 of the drawing against movement into the cylinder or to the right as viewed in Figs. 2, 4 and 5 of the drawing.

The cylinder 8 is provided with a shoulder 17 and a spring 18 interposed between the shoulder and the fixed supporting bracket 9. The cylinder 8 is provided at its other end with a threaded reduced portion 19 defined by the shoulder 8' that permits adjusting and locking nuts 20 to be threaded thereon that permit setting of the cylinder and plunger and are then locked against the bracket 9. The spring 18 must be stronger than the compression spring 15 to allow for a set amount of lost motion movement between cylinder 8 and bracket 9 to occur before there will be any adjustment or movement of plunger 7 in cylinder 8.

In operation the parts will be assembled, as shown in the drawing, with the release spring 4' normally drawing the brake shoes toward each other to maintain a clearance. The cylinder or support 8 will be passed into the bracket 9 and the plunger 7 introduced into the support and into the guide 13. The nuts 20 will then be adjusted on the threaded end 19 so as to provide a suitable clearance between the shoulders 8' and the bracket 9. This distance is the amount of clearance that the brake shoes will have relative to the brake drum.

The spring 18 abuts the bracket 9 and the shoulder 17 and normally urges the support or cylinder 8 to the left as seen in the drawing so as to bring the adjusting nuts 20 against the bracket 9 and thus limit the movement to the left.

The spring 15 and washer 14 are, of course, about the plunger 7. The spring urges this plunger to the left also until the end 11 thereof abuts against the inside of the brake shoe at 11'. When the brake shoes are operated to braking position the springs 15 and 18 cause the plunger 7 and the support 8 to move as a unit to the left. Figs. 2 and 5 show the parts in the position which they will assume during the braking action. When, however, the brakes are released and the spring 4' moves them to released position, the spring 4' being stronger than the spring 18 will cause the brake shoe to force the plunger 7 and support 8 to the right, so as to move the shoulder 8' against the bracket 9. In this manner the amount of clearance is fixed by the adjustment of the nuts 20.

As the brakes are operated and wear occurs when the braking action is performed the nuts 20 will limit the movement of the support 8 to the left. If the brake shoe, however, continues to move due to the fact that the brake lining is worn away, then the spring 15 will cause the plunger 7 to follow the brake shoe and the plunger will be withdrawn slightly from the support 8. When the braking action is released, however, the washer or lock ring 14 again grips the plunger 7 and will not allow it to return into the support 8. In this manner as the wear on the brakes occurs the plunger 7 gradually creeps forward to compensate for this wear. The locking washer 14 always catches the plunger to prevent its return so that the clearance is defined as the distance which has been set between the shoulder 8' and the washer 9 by the adjusting nuts 20.

I claim:

1. A brake assembly to automatically compensate for wear comprising a brake plate, a pair of brake shoes thereon, brackets on each plate, one for each shoe, a support member mounted in each of said brackets, means to adjust the position of each support member relative to said bracket, a spring to normally urge each support member to such adjusted position, a releasing spring for the brake shoes adapted to move said support members in a direction opposite to that of said first named spring, means on the support to limit said movement of the support members relative to their brackets by said release spring, a plunger member slidably guided by each support member and abutting the associated brake shoe, a spring on said plunger, a lock member about said plunger, means on each support member to cause said lock member to lock said plunger against its support member when the associated shoe moves the plunger, said lock member being releasable to free the plunger for movement with its shoe as the latter moves away from the associated bracket beyond the adjusted distance of said first means.

2. A brake assembly to automatically compensate for wear comprising a brake plate, a pair of brake shoes thereon, brackets on each plate, one for each shoe, a support member mounted in each of said brackets, means to adjust the position of each support member relative to said bracket, a spring to normally urge each support member to such adjusted position, a releasing spring for the brake shoes adapted to move said support members in a direction opposite to that of said first named spring, means on the support to limit said movement of the support members relative to their brackets by said spring, a plunger member slidably guided by each support member and abutting the associated brake shoe, a spring on said plunger, a lock member about said plunger, means on each support member to cause said lock member to lock said plunger against its support member when the associated shoe moves the plunger, said lock member being releasable to free the plunger for movement with its shoe as the latter moves away from the associated bracket beyond the adjusted distance of said first means, said lock member comprising a lock washer, and said last means comprising an inclined end face on said support to cant said washer to locking position on the plunger.

3. An attachment for brakes comprising a pair of relatively slidable members, a brake shoe and a release spring therefor, means to normally urge said members apart and to lock them against return movement by the brake shoe releasing spring, and means to mount said attachment on the brake assembly to abut the brake shoe, and a means adjustable to position said attachment to effect a predetermined brake shoe clearance and adapted to follow the shoe only to the extent of said predetermined clearance, the aforesaid members being thereafter adapted to be urged apart to compensate for any clearance in excess of such predetermined clearance that may result from wear of the brake shoe.

RICHARD SAENGER.